US009483952B2

(12) United States Patent
Chew

(10) Patent No.: US 9,483,952 B2
(45) Date of Patent: Nov. 1, 2016

(54) RUNWAY SURVEILLANCE SYSTEM AND METHOD

(75) Inventor: Khien Meow David Chew, Singapore (SG)

(73) Assignee: STRATECH SYSTEMS LIMITED, Singapore (SG)

(*) Notice: Subject to any disclaimer, the term of this patent is extended or adjusted under 35 U.S.C. 154(b) by 681 days.

(21) Appl. No.: 12/674,966

(22) PCT Filed: Aug. 25, 2008

(86) PCT No.: PCT/SG2008/000311
§ 371 (c)(1),
(2), (4) Date: May 20, 2010

(87) PCT Pub. No.: WO2009/029051
PCT Pub. Date: Mar. 5, 2009

(65) Prior Publication Data
US 2011/0063445 A1 Mar. 17, 2011

(30) Foreign Application Priority Data

Aug. 24, 2007 (SG) .................. 200706212

(51) Int. Cl.
G08G 5/04 (2006.01)
G08G 5/06 (2006.01)
(Continued)

(52) U.S. Cl.
CPC .......... *G08G 5/04* (2013.01); *G08B 13/19652* (2013.01); *G08B 13/19691* (2013.01); *G08G 5/0026* (2013.01); *G08G 5/06* (2013.01); *G08G 5/065* (2013.01); *G06T 7/0008* (2013.01);
(Continued)

(58) Field of Classification Search
CPC ........ G08G 5/04; G08G 5/06; G08G 5/0026; G08G 5/065; G08B 13/19652; G08B 13/19691; G06T 7/0008; G06T 2207/10021; G06T 2207/30184; G06T 2207/30236
USPC .................. 348/143, 144, 148, 159
See application file for complete search history.

(56) References Cited

U.S. PATENT DOCUMENTS 4,179,695 A 12/1979 Levine et al.
5,097,329 A * 3/1992 Hasegawa et al. ........... 348/171
(Continued)

FOREIGN PATENT DOCUMENTS

EP 1712931 10/2006
GB 2372315 8/2002
(Continued)

OTHER PUBLICATIONS

Nils T. Siebel, Design and Implementation of People Tracking Algorithms for Visual Surveillance Applications, The University of Reading, Mar. 2003.
(Continued)

*Primary Examiner* — Gregory Todd
(74) *Attorney, Agent, or Firm* — Volpe and Koenig, P.C.

(57) ABSTRACT

A surveillance system and method for detecting a foreign object, debris, or damage (FOD) on a runway. The system comprises one or more cameras for capturing images of the runway; and an image processing system for detecting the FOD on the runway based on adaptive image processing of the images captured by the cameras; wherein the surveillance system is adaptively operable for FOD detection under both day and night ambient light conditions without assisted illumination such as infrared or laser illuminators.

30 Claims, 10 Drawing Sheets

(51) Int. Cl.
  *G08B 13/196* (2006.01)
  *G08G 5/00* (2006.01)
  *G06T 7/00* (2006.01)

(52) U.S. Cl.
  CPC ........... *G06T2207/10021* (2013.01); *G06T 2207/30184* (2013.01); *G06T 2207/30236* (2013.01)

(56) References Cited

U.S. PATENT DOCUMENTS

| | | | | |
|---|---|---|---|---|
| 5,375,058 | A * | 12/1994 | Bass | 701/120 |
| 6,064,429 | A * | 5/2000 | Belk et al. | 348/128 |
| 6,563,432 | B1 * | 5/2003 | Millgård | 340/961 |
| 6,917,309 | B2 * | 7/2005 | Nitzan et al. | 340/945 |
| 7,253,748 | B2 * | 8/2007 | Nitzan et al. | 340/945 |
| 8,022,841 | B2 * | 9/2011 | Alon et al. | 340/945 |
| 8,111,289 | B2 * | 2/2012 | Zruya et al. | 348/144 |
| 2002/0080046 | A1 | 6/2002 | Derringer | |
| 2002/0109625 | A1 * | 8/2002 | Gouvary | 342/29 |
| 2004/0080433 | A1 | 4/2004 | Nitzan et al. | |
| 2006/0098843 | A1 * | 5/2006 | Chew | 382/103 |
| 2007/0008185 | A1 | 1/2007 | Nitzan et al. | |
| 2011/0063445 | A1 * | 3/2011 | Chew | 348/159 |

FOREIGN PATENT DOCUMENTS

| | | |
|---|---|---|
| JP | 2000-207693 A | 7/2000 |
| JP | 2001-028745 A | 1/2001 |
| JP | 2002277544 | 9/2002 |
| JP | 2004-009993 A | 1/2004 |
| JP | 2004219214 | 8/2004 |
| JP | 2006-018658 A | 1/2006 |
| WO | 02055362 | 7/2002 |
| WO | 02101411 | 12/2002 |
| WO | 2004008403 | 1/2004 |
| WO | 2006109074 | 10/2006 |

OTHER PUBLICATIONS

European Office Action issued Oct. 24, 2012 for Application No. 08 794 216.5-2218.

Japanese Office Action issued Sep. 4, 2012 for Application No. 2010-522873.

Stephan et al., Automatic extraction of runway structures in infrared remote sensing image sequences, Proceedings of SPIE, 2005, 598208-1-598208-10, vol. 5982, Bellingham, WA, 2005.

* cited by examiner

RUNWAY SURVEILLANCE SYSTEM AND METHOD

FIELD OF THE INVENTION

The present invention relates broadly to a system and method for runway surveillance.

BACKGROUND

Runway surveillance is very important for airport operation. Runways are continuously subjected to damages, such as potholes created as a result of wear and tear of aircraft or other vehicles using the runways. Occasionally, debris or foreign objects may occur on runways, which can be due to jet blast, aircraft take-off/landing, natural causes etc. On an active runway involving the movement of aircrafts, the presence of FOD may lead to an air crash and consequential loss of life resulting in significant losses to airline companies.

Different methods are employed to conduct runway surveillance: Conventionally, inspection officers move around the airport runways to conduct visual and manual surveillance, periodically. Visual inspection is slow, and labor intensive. Furthermore, visual inspection is unreliable as it is subjected to conditions surrounding the runway.

Some airports use automated systems employing radar to detect damages, debris and other hazards on an airport runway and its adjacent areas. In a system using radar, a microwave signal is usually transmitted over a runway and reflected signals from any foreign object are detected and analyzed. Since the microwave signals are pulsed or structured, the time taken for the signal to reach the receiver is calculated from which the distance to the foreign object is derived. By using radar sensors having smaller wavelengths and higher pulse repetition frequencies, it is possible to achieve higher resolution in range, which in turn, may reduce the background clutter.

However, a system using any radar for runway surveillance has its own limitations. While radar is an excellent means to detect metal objects, it is less sensitive in detecting non-metallic objects, such as rubber. Objects made of materials having poor radar signature (e.g. rubber) can cause major problems for such radar-based systems. Further, radar may not be relied upon for detecting smaller non-metallic objects. Further limitations include radar blind spots or shadows due to blockages caused by other objects or infrastructure. In addition, radar may trigger a false alarm by indicating a strong signal for signals reflected from even small metal objects that may not be so hazardous. A radar based surveillance system thus lacks "intelligence" and suffers from inability to provide visual image of the object for verification and characterization by the operator.

Some airports utilize infrared or thermal-imaging systems to detect objects, cracks voids etc. on a runway. However, systems employing infrared or thermal-imaging systems can only sense the infrared radiation (emitted from objects), which is outside the thermal equilibrium of the surroundings i.e. a infrared or a thermal imaging system can only detect objects (e.g. a piece of warm metal debris on a cool runway) which have sufficient thermal contrast. Small objects which have poor thermal contrast may pose significant challenges for infrared/thermal imaging system. Further, the performance of such systems is unpredictable under adverse weather (e.g. cold weather) conditions. In addition, infrared/thermal imaging systems also lack the resolution needed for object detection, characterization and classification.

Recently, surveillance using one or more video cameras placed near the runways has been proposed. Video signals obtained from the cameras are visually monitored by an operator on the console of an airport control room.

It has also been proposed to rely on image processing (e.g. background subtraction) to detect any FOD by processing video images of runways received from the surveillance cameras.

FOD detection using background subtraction has a number of problems. Firstly, the pixel properties are not always sufficient to discriminate correctly between the background and the foreground pixel. Furthermore, background is subjected to changes such as due to noise, clutter, extraneous events, variations in illumination conditions and weather conditions.

Furthermore, currently used image processing system is dependent on ambient lighting conditions and is not suitable for low lighting conditions, which causes significant problems in pixel characterization.

Video cameras used in existing surveillance systems require additional assisted illumination such as a laser light or infrared light for night surveillance. This, in turn, requires significant infrastructure in an airport using such a system, which increases cost. Also, the presence of an optical light such as a laser light or infrared light can interfere with other systems used in the airport, and may pose safety problems for navigation of aircrafts at the airport, and may pose a hazard to pilots etc.

Accordingly, there is a need to provide a runway surveillance, which seeks to address one or more of the above problems.

SUMMARY OF THE INVENTION

In accordance with a first aspect of the present invention there is provided a surveillance system for detecting a foreign object, debris, or damage (FOD) on a runway comprising one or more cameras for capturing images of the runway; and an image processing system for detecting the FOD on the runway based on adaptive image processing of the images captured by the cameras; wherein the surveillance system is adaptively operable for FOD detection under both day and night ambient light conditions without assisted illumination such as infrared or laser illuminators.

The image processing system may apply image enhancement methods to enhance the captured images.

Means for enhancing the captured images may comprise a high pass filter, a Sobel X from left_to_right filter and a Sobel X from right_to_left filter, or a Scharr X filter to the captured image.

The image processing system may determine if the instant of processing is a day-time or night-time; and detects an abnormal light condition, such as due to aircraft landing or aircraft taking off or ground vehicle movement, from the captured image during night-time.

Detecting of the abnormal light condition may comprise global histogram and statistical analysis to compare each image with one or more preceding images and identifies the abnormal light condition based on a change in intensity with reference to a threshold value.

Images for which the abnormal light condition are detected may be ignored from further processing.

The image processing system may adaptively estimate one or more threshold values for optimal FOD edge extraction for different environmental conditions; and generates a pixel level edge map using a statistical method based on progressively learned background image edge map to determine the grayscale lookup table (LUT) to be used to generate pixel level threshold map.

The image processing system may further apply temporal filtering to a stack of pixel level edge maps to retain only the robust edge map which consists only of pixels that have accumulated to pass the threshold.

The image processing system may further subject the robust edge map to adaptive background learning, the adaptive background learning comprising comparing background edge images obtained at previous instants with current image; identifying slow-change features on the runway; and updating the background edge image with the slow changing features.

The image processing system may further generate a composite background edge map comprising an adaptive background edge map, a previously learned and saved day or night background edge map, and a seasonal marking map generated for a particular season or weather conditions.

The image processing system may further compare the composite background edge map and the robust edge map; and removes background edges to extract a suspected edge map of FOD.

The image processing system may further perform edge filtering to filter unwanted edges related to environmental changes from the suspected edge map, and computes edge parameters of FOD from the suspected edge map, The environmental conditions may include day to night transition, or night to day transition, weather conditions, rain, smoke, cloud or the like.

The image processing may further overlay an FOD graphic on a suspected region of the runway on a video display to alarm an operator at a control tower or control room of FOD detection.

One or more of the cameras, or one or more additional cameras may be arranged for zooming on to the suspected region for visual verification.

The image processing system may further classify the FOD.

The one or more cameras may comprise one or more static cameras, one or more non-static cameras or a combination of both static and non static cameras.

The cameras may be placed on one side of the runway.

The cameras may be placed on either sides of the runway in a staggered manner.

When one or more cameras fail to function, respective adjacent cameras may be operable to cover the areas covered by the failed cameras.

The one or more cameras may comprise one or more monochrome cameras, one or more colour cameras or both.

The surveillance system may further comprise one or more night vision cameras.

A runway surface may be divided into a plurality of segments, and one or more non-static cameras sequentially scan the runway segment-by-segment for FOD detection.

A static camera may detect respective locations of aircraft take off and landing on the runway such that a non-static camera is directed to first scan runway segments in the respective locations of aircraft landing or take off to reduce FOD detection time.

The image processing system may apply temporal filtering to filter out rain clutter in runway scene images by recognising rain-like characteristics of rain motion clutter and based on the motion clutter due to rain occurring across the entire runway.

The image processing system may apply temporal filtering to filter out snow clutter in runway scene images by recognising snow-like characteristics of snow motion clutter and based on the motion clutter due to snow occurring across the entire runway.

The image processing system may make use of markers or runway edge lights located along the longitudinal (horizontal) direction on the runway and on same vertical distance from the side of the runway for runway scene calibration to map pixels on the images of the runway to precise co-ordinates on the real-world co-ordinate frame (such as WGS84 or Airport Grid).

The image processing system may make use of two parallel horizontal runway lines on each side of a runway middle line and the runway middle line to derive two vertical pixel mapping ratios for runway scene calibration to map pixels on the images on the runway to precise co-ordinates on the real-world co-ordinate frame (such as WGS84 or Airport Grid).

The image processing system may make use of monoscopic vision and calibrated runway scene image captured by a monoscopic camera to determine the position and range of the FOD on the runway.

The system may make use of the FOD position and range determined by a static camera and a calibrated runway scene image to automatically control the non-static camera (such as a pan tilt zoom camera) to pan and/or tilt and/or zoom and/or focus onto a FOD to obtain telephoto images of the FOD with sufficient details to enable the verification of detected FOD or to filter a false alarm The system may make use of stereo vision using a pair of surveillance cameras to cover the same segment of the runway so that FOD range and position can be computed from the difference image obtained by comparing the two images as captured by the two cameras covering the same area of surveillance (field of view) on the runway.

In accordance with a second aspect of the present invention there is provided a surveillance method for detecting a foreign object, debris, or damage (FOD) on a runway, the method comprising capturing images of the runway; performing adaptive image processing of the images captured for detecting the FOD on the runway; wherein the method is adaptively operable for FOD detection under both day and night ambient light conditions without assisted illumination such as infrared or laser illuminators.

BRIEF DESCRIPTION OF THE DRAWINGS

The present invention is further described by way of non-limiting embodiments, with reference to the accompanying drawings, in which.

DETAILED DESCRIPTION OF PREFERRED EMBODIMENTS

Figure 1A:
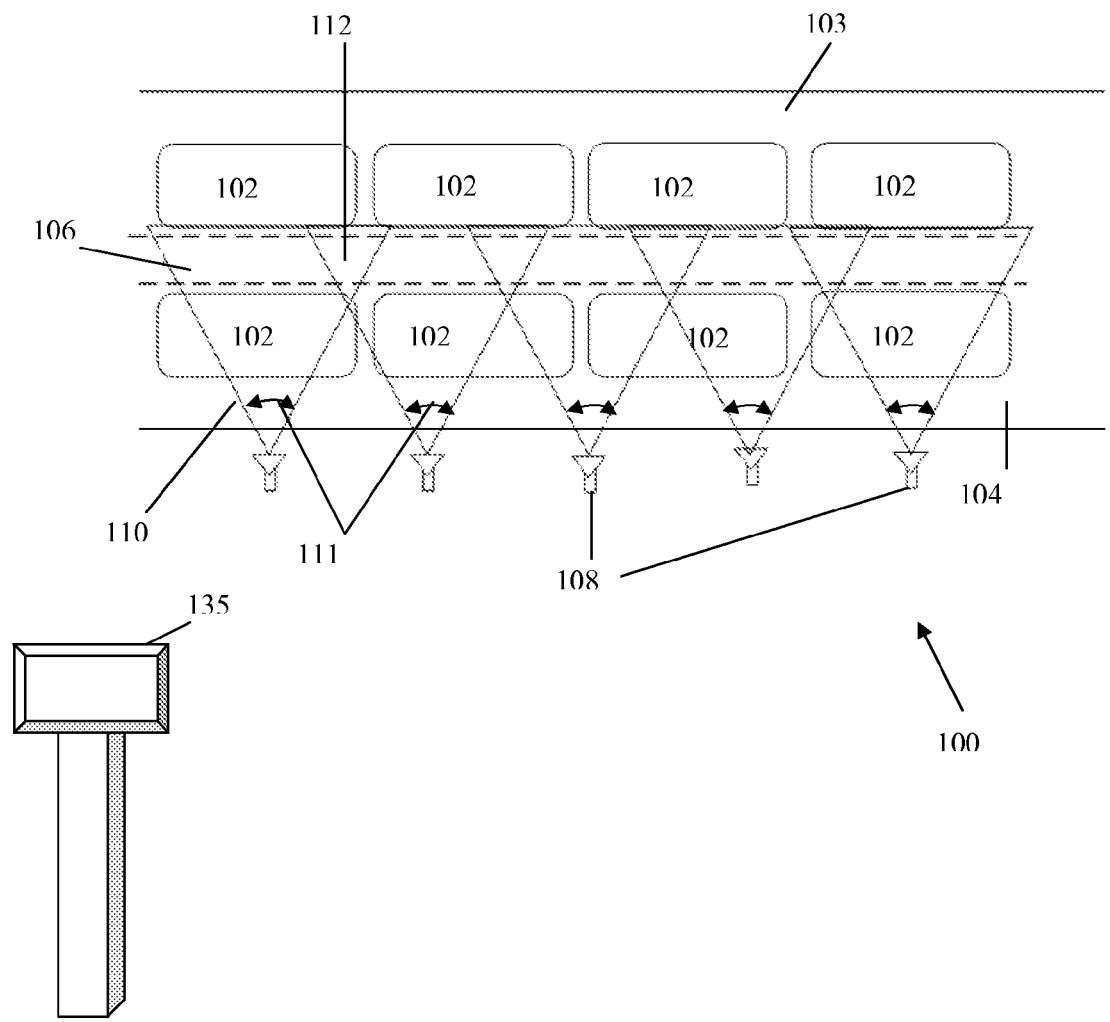
FIGS. 1A and 1B are schematic drawings illustrating arrangement of surveillance cameras in a surveillance system to detect foreign objects, debris or damages (FOD) on a runway.

FIG. 1A is a schematic drawing illustrating an arrangement of surveillance cameras in a runway surveillance system 100 to detect foreign objects, debris or damages (FOD) on a runway 106 according to an example embodiment. The runway 106 is centrally located, adjacent to taxiways 103, 104 and grass fields 102. A plurality of surveillance cameras 108 facing the runway are deployed along one edge of the taxiway 104 such that the axis of each surveillance camera 108 is perpendicular to the length of the runway 106. Each surveillance camera 108 is operable to scan a field of view 110, having a horizontal angle of view 111. Each field of view 110 includes portions from the taxiways 103, 104, runway 106 and grass fields 102. Each field of view 110 also includes intersecting portions 112 from an adjacent camera 108, along the runway 106.

The surveillance cameras 108 are positioned 200-300 m away from the runway and create about 15% of overlapping among adjacent cameras.

Video data from each of the camera 108 is feed to an application computer system (not shown) in a control tower or control room 135 of an airport. The received video data is processed by a video processing unit of the application computer system. The application computer system continuously processes the video from the surveillance cameras to detect FOD and alert the operator when a FOD is detected. An operator in the control tower or control room 135 will also able to visually monitor the real time runway images on a video display (not shown). In case any foreign object, debris or damage (FOD) is detected when the application computer system is processing the video data, the operator is warned of it (visual and/or audible alarm and/or by remote wireless alert via mobile communication means such as GSM SMS or MMS). Upon receiving the alarm and/or remote wireless alert, the operator zooms a surveillance camera 108 onto the detected object to visually verify the FOD. If an FOD is confirmed, an alarm (audible and/or visual) is triggered in the control tower or control room 135. The detection of a FOD also triggers a remote alarm (audible and/or visual) located near the runway 106. A wireless alert (such as GSM SMS or MMS) would also be triggered to notify the runway recovery team. Thus, immediately, a runway recovery team dispatches a recovery vehicle to clear the detected FOD i.e. remove the foreign object, debris or repair the damage.

The surveillance cameras used are passive and are not equipped with illuminators (such as laser or infrared illuminators). Each of the surveillance cameras 108 can be one of a high resolution day/night vision camera, a low lux high sensitivity colour camera, a camera with light intensifier CCDs (ICCD camera), a camera with electron-multiplier CCD (EM-CCD camera), a night vision camera, static camera, a high resolution mega-pixel camera, a non-static camera (such as panning camera, pan tilt zoom (PTZ) camera or zoom camera) or a thermal imager. The surveillance system is thus able to operate using only passive cameras and without the need to install additional assisted illumination (such as infrared illuminators or laser illuminators).

The surveillance cameras 108 used in the system 100 are capable of generating video images of the runway for image processing. However, still picture digital cameras may also be used to generate digital still images of the runway for image processing.

For example, a zoom camera or PTZ camera can be used to zoom into any area on the runway to obtain a detailed view of a FOD. As the zoomed-in video images provide more details of an area of interest on the runway, an operator is in a better position to assess the potential hazard caused by the FOD detected and to initiate appropriate action immediately. The PTZ camera or zoom camera can be remotely controlled by the application computer system to zoom into the area of interest on the runway whenever the application computer system detects a FOD, in the example embodiment.

Figure 1B:
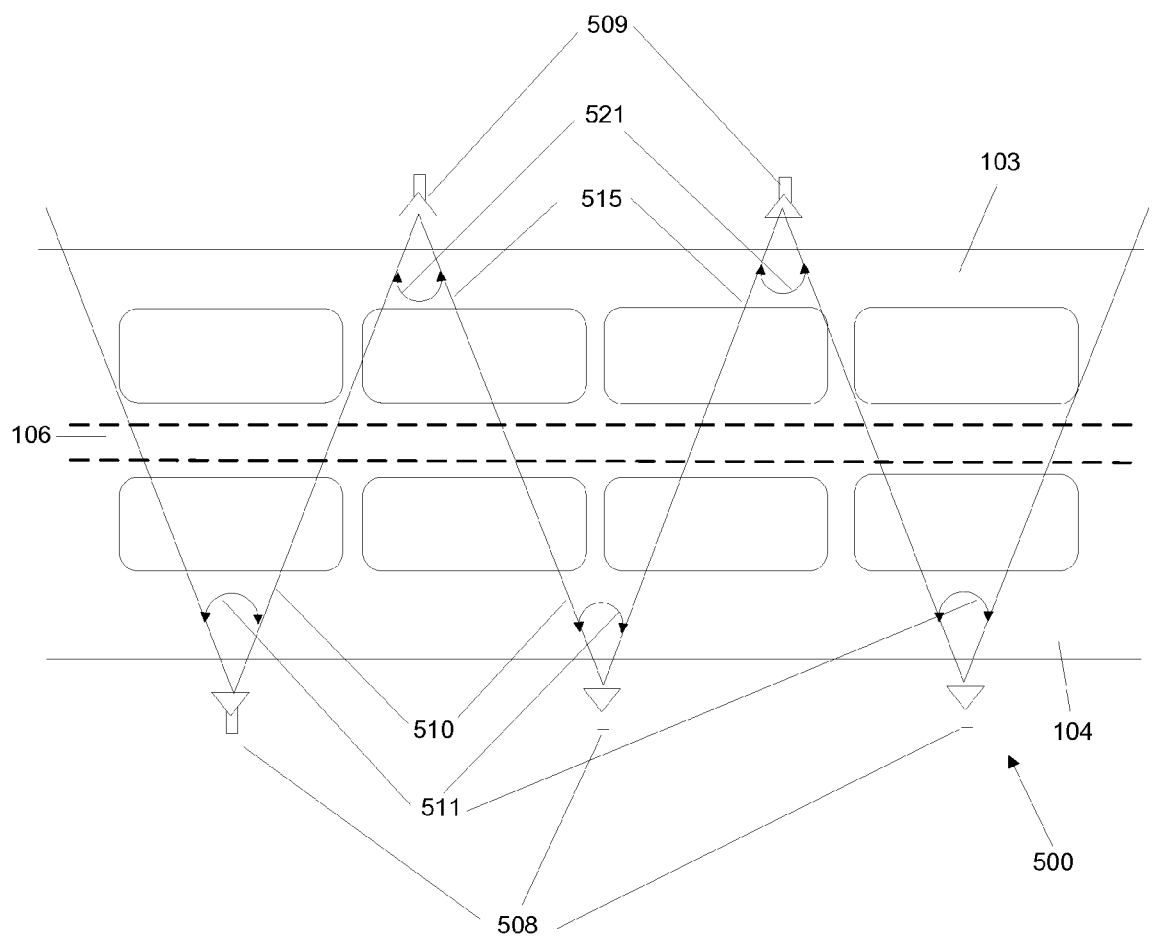

FIG. 1B is a schematic drawing illustrating an alternative arrangement of surveillance cameras in a runway surveillance system 500 to detect FOD on a runway 106. A plurality of surveillance cameras 508 facing the runway is deployed along an edge of the taxiway 104. Another plurality of surveillance cameras 509 facing the runway is deployed along the other far end edge of the taxiway 103. The axis of each surveillance camera 508, 509 is perpendicular to the length of the runway 106. Each surveillance camera 508 is operable to surveillance a field of view 510, having a horizontal angle of view 511. Each surveillance camera 509 is operable to surveillance a field of view 515, having an horizontal angle of view 521. Each field of view 510, 515 includes portions from the taxiways 103, 104, runway 106 and the grass fields 102. The cameras 508, 509 are arranged alternatingly such that the field of view 510 and 515 of adjacent cameras alternate each other and have a clear line of demarcation or with some small overlaps.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as, "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The application computer system in the control tower or control room 135 has the following functions:

1. Configuring the surveillance system with respect to the number of cameras, coverage area (field of view) for each camera, camera calibration, events for which an alert should be generated, types of alerts etc.

2. Selecting the field of view of each surveillance camera (by remotely adjusting the camera's angle of view) in order to enable an operator to effectively confirm the FOD, determine whether the FOD is a foreign object, debris or damage on the runway and classify the foreign object. The video display can show multiplexed video from a plurality of surveillance cameras.

3. Selecting the field of view (angle of view) of each pan tilt zoom (PTZ) or zoom camera by automatically adjusting each PTZ or zoom camera to pan, tilt and/or zoom into a desired area of interest on the runway. The relevant PTZ or zoom camera is remotely controlled by the application computer system for automatically zooming into a portion suspected to be damaged or contain debris or foreign object. This function can also be performed by the operator manually and remotely with the use of the application computer system.

4. Configuring audible or visual alerts whereby in the event a problem on the runway is registered (i.e. a FOD detected), the system is operable to automatically generate a priority list of alerts in which the top priority is given for the largest crater or most hazardous debris, or foreign object so as to enable the operator to take necessary corrective action according to the priority list. The alert can be configured to be an audio and/or visual or both. The alert could also include remote wireless alert via mobile communication means such as GSM SMS or MMS.

5. Processing and recording of video images and/or still picture images captured by the various surveillance cameras in case the system detects an FOD on a runway and play back of the recorded video images and/or still picture images of the runway scene.

6. Management of event, video data and other data stored. All relevant data are logged in the database for easy retrieval and generation of various reports.

7. System interface in order to allow other systems to access the database.

8. System interface for sharing real time data to allow other systems to obtain real time data and system-wide status, including details of all the field equipment. Integrating real time data with aircraft landing/taking off control system is useful in providing immediate safety to the aircraft and crew.

Figure 2:
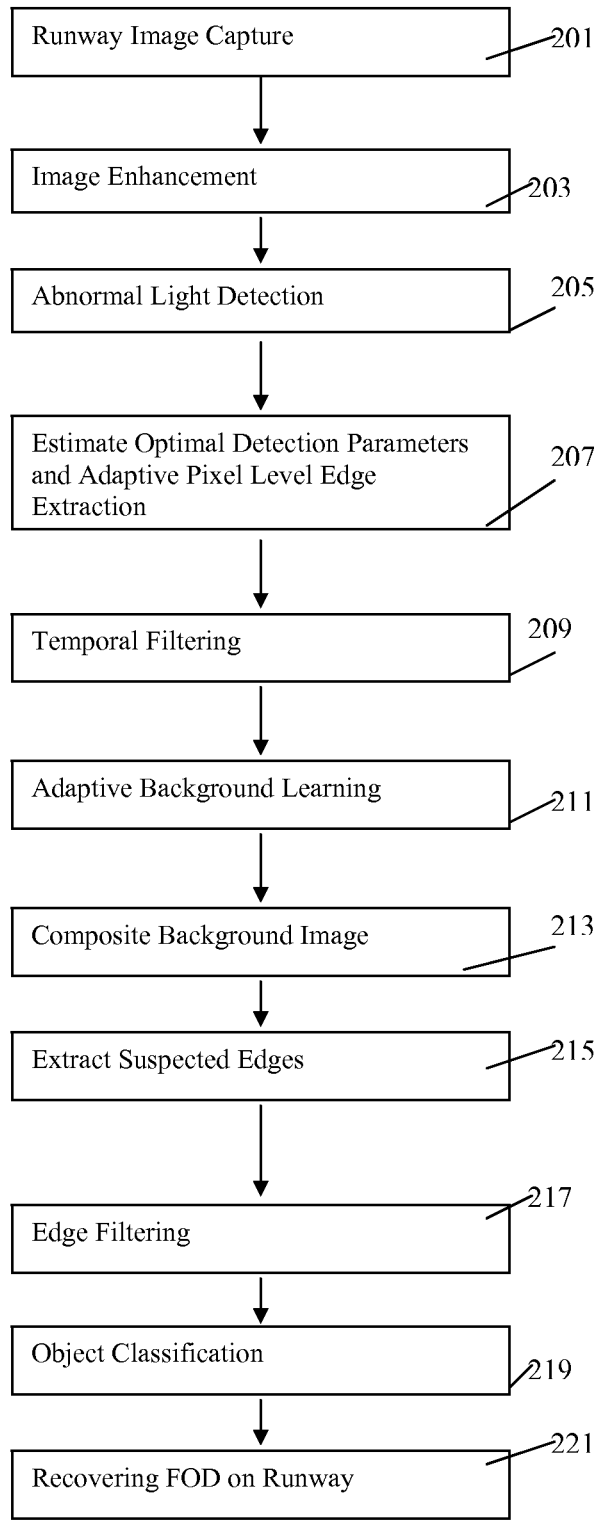
FIG. 2 is a basic flow chart of FOD detection according to one embodiment.

FIG. 2 is a basic flow chart of FOD detection according to one embodiment.

At step 201, surveillance cameras capture respective images of a portion on a runway. The steps involved in processing the captured images are explained in the following paragraphs.

At step 203, image enhancement is performed to preprocess the captured image. The gradual grey scale change in X direction (parallel to the runway direction) and the highly contrasted runway white lines are eliminated to enhance the features that have high gradient change in the direction parallel to the runway (almost all real 3D foreign object, damages, or debris (FOD) have those properties).

All pixels in output image become almost zero (including white runway lines and regions that have grey scale gradient change due to moving cloud or raining) except some prominent runway lights and FOD. This step can assist in reliable FOD detection with low false alarm rate.

In order to achieve optimum results, high pass filters, such as Sobel X from left_to_right plus right_to_left or Scharr X are used.

At step 205, abnormal light detection is applied for detection at night. A sudden bright light or bright spot on the runway scene can bloom the surveillance camera 108. This may happen when aircrafts land, take off or when ground vehicles move at night. The detection algorithm determines such situations. If abnormal light is detected, the images are ignored. The algorithm does a global histogram and statistical analysis (e.g. average grey scale) to compare the captured images with the progressively updated image. The algorithm also makes use of the parameters of the bright spots (such as size, area . . . etc) to determine if abnormal light condition exists.

At step 207, optimal detection parameters are estimated and adaptive pixel level edge map is extracted. Under different weather and day/night condition, an image of a runway 106 may look very different. The image can be smooth or rough or with lots of reflection. This step is to adaptively estimate the optimal FOD edge extraction threshold to extract real FOD edges with minimum noise. The algorithm uses statistical method (e.g. mean, deviation)

based on original (excluding motion area) or progressively learned background image to determine the grayscale lookup table (LUT) to be used for generating pixel level threshold map.

At step 209, temporal filtering is applied to a stack of edge maps to retain robust edges with reduced noise. Temporal filtering is applied to pixel level. Only those pixels that have accumulated to pass a certain threshold are considered as robust edge pixels (to be used in the robust edge map). Those pixels that flicker are not able to accumulate to pass the threshold and thus be deleted (not used in robust edge map).

At step 211, adaptive background learning is performed using a principle of infinite impulse response (IIR) for background learning.

$B_t$: background image at time t,
$B_{t-1}$: background image at time t−1,
$I_t$: current image at time t,
Then the background image is updated by:

$$B_t = B_{t-1}*\alpha + I_t*(1-\alpha)$$

The system primarily uses edge map for background learning. The learned features include mainly the center lights and some edge lights falling slightly inside the runway region due to low camera angle. The main objectives of the adaptive background learning is to capture a slow feature changing process on the runway in order to blend into the background, without generating false alarm, and to save the learned background edge map into file or data base on a daily basis for use as background edge map for the next day. This allows the system to adapt to runway marking changes as quickly as possible.

At step 213, composite background edge map is obtained. Composite background edge map represents the runway markings. Composite background edge map consists of adaptive background edge map, saved background edge map of the previous day and optionally seasonal markings (seasonal markings are generated during a particular season or weather condition such as snow). They can simply be added up or further processed to form the final background edges.

At step 215, suspected edges are extracted by comparing the edge map and the composite background edge map. At this step, the runway marking edges from the processed image (composite background edge map) at step 213 are removed. The remaining edges are possibly FOD.

At step 217, edge filtering is performed to filter some of the edges that are not part of FOD but may due to other weather conditions, such as snowing, raining or morning glare. Weather condition is detected through sensors and/or image processing methods. This step involves using one or more selectable algorithms to detect those weather conditions e.g. when the runway lights are switched on because of rain, reflection can arise on a runway. A specific filtering algorithm locates the light and filters the reflection edges.

Object Classification is performed at step 219 to determine if detected object from Step 217 is indeed FOD. Some examples of object classification methods are pattern matching, Bayes classifier, Linear Discriminant classifier, neural network classifier, fuzzy classifier and neural fuzzy classifier.

Using filtered edges from step 217, the system extracts the relevant object attributes for example length, height, perimeter, area, texture, chromatic properties (hue and saturation), luminous intensity (grey level). These object attributes forms the input vector for the object classification to determine if the detected object is indeed FOD.

At step 221, once a FOD is detected, an operator in the control tower or control room is warned of it either by visual and/or audible alarm and/or wireless alert (such as GSM SMS or MMS). Upon receiving the alarm and/or wireless alert, the operator zooms a surveillance camera on to the detected FOD. If an FOD is confirmed, another alarm (audible and/or visual) is triggered in the control tower or control room. FOD confirmation also triggers a remote alarm (audible and/or visual) located near the runways. Additionally or alternatively a wireless alert (such as GSM SMS or MMS) could also be triggered to notify the runway recovery team. Immediately, a runway recovery team dispatches a recovery vehicle to clear the detected FOD i.e. remove the foreign object or debris or repair the runway damage.

Figure 3A:
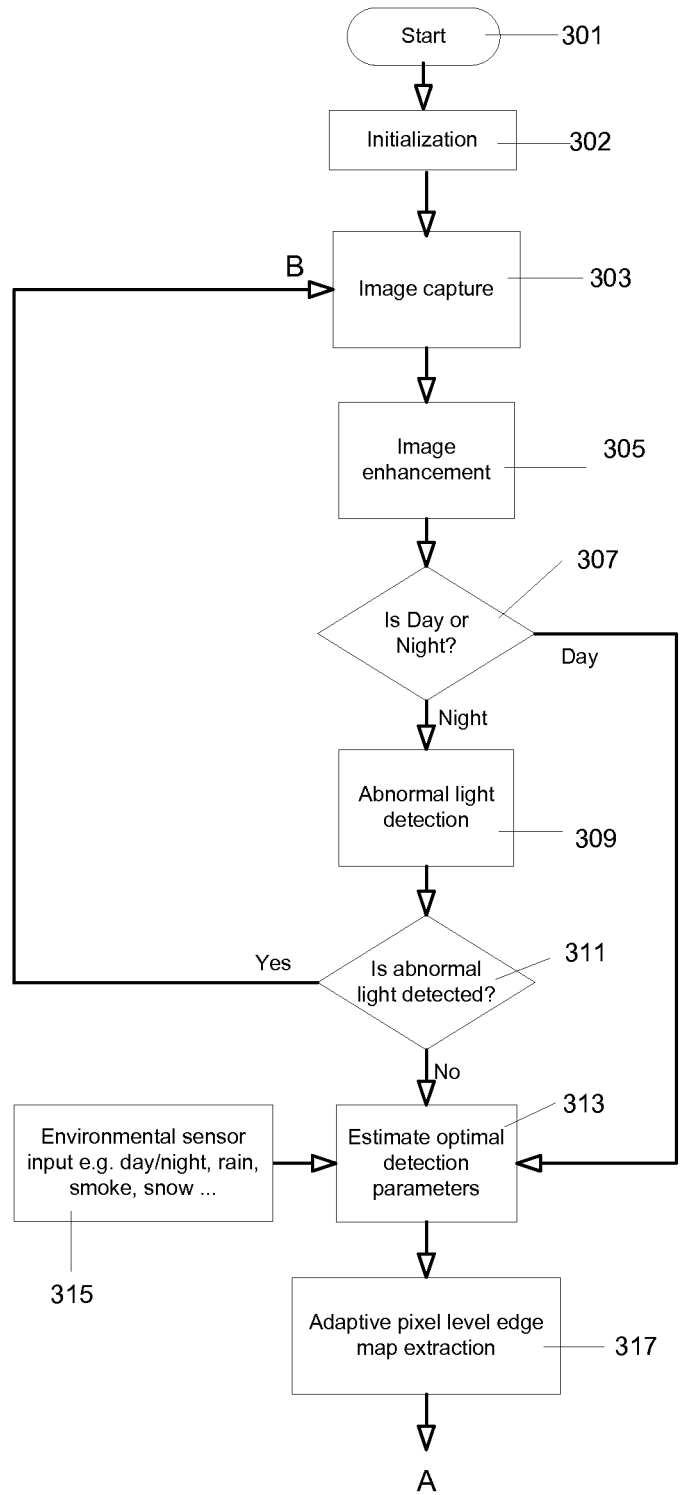
FIGS. 3A and 3B are detailed flow charts of one embodiment of the present invention.
Figure 3B:
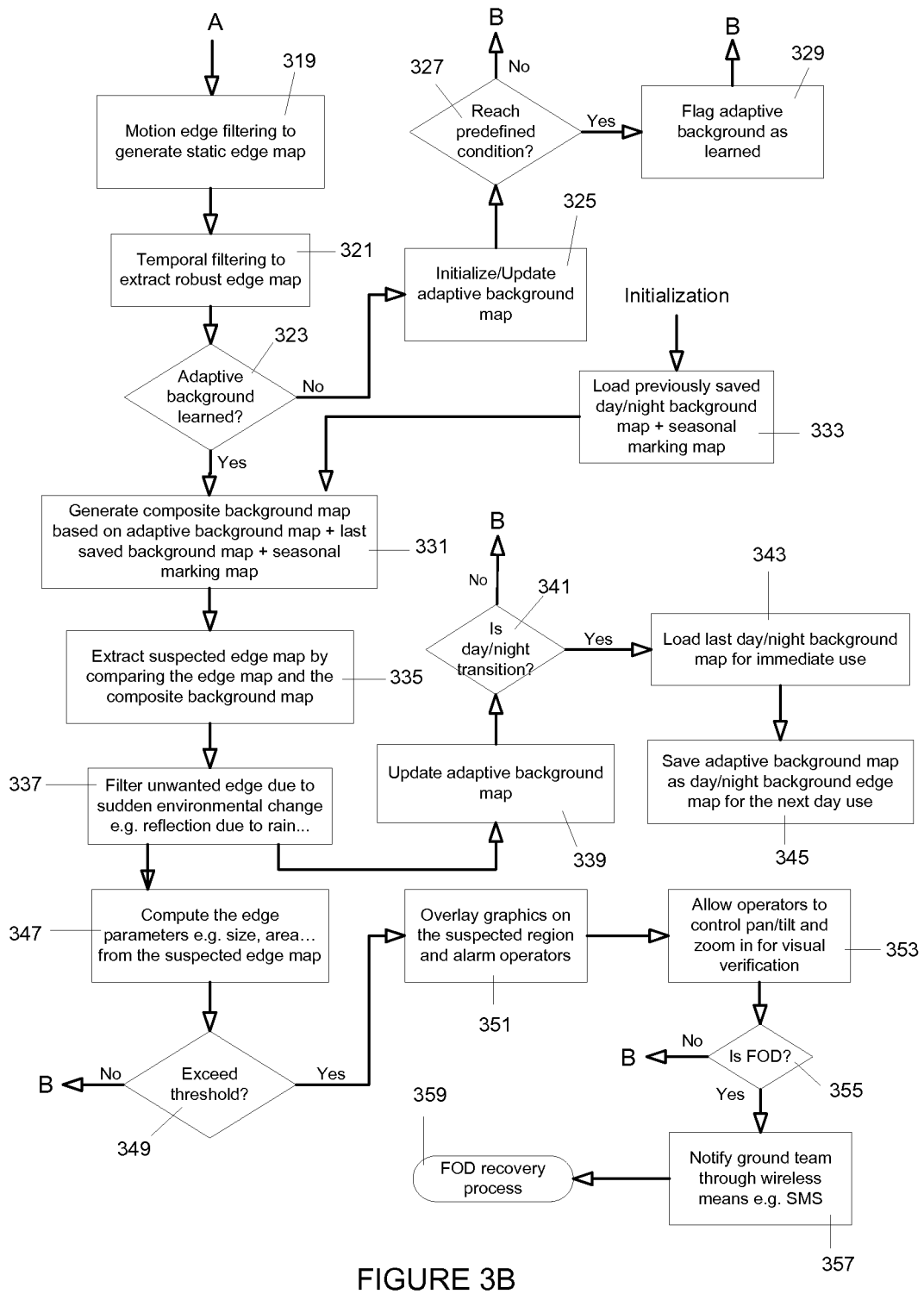

FIGS. 3A and 3B are detailed flow charts of one embodiment of the present invention. Upon starting the process at step 301, the system is initialized at step 302. At step 303, a surveillance camera captures an initial mage of a portion of runway.

The images are analyzed to detect any motion. Only images devoid of any motion are used for background learning and eventually stored as reference background images in a database in this example embodiment.

At step 305, the captured image is subjected to image enhancement to pre-process the captured image. After image pre-processing, all the pixels in the image become zero (including pixels corresponding to white runway lines and regions that have a change in the grey scale gradient due to a moving cloud or rain) except some prominent runway lights.

At step 307, a check is made to find if there is a day to night, or night to day transition. For example, this can be achieved by monitoring a difference in light intensity of a sensor or a camera. Light intensity changes for day to night or night to day transition is normally much greater than due to weather changes. In case a day to night, or night to day transition or night condition is detected, at step 309, an abnormal light detection check is performed. In case an abnormal light is detected at step 311, the previously captured image is ignored and the next image is captured from step 303. In case no abnormal light is detected, the estimated optimal foreign object, debris or damage (FOD) detection parameters are derived at step 313, for different environmental conditions (e.g. day/night, rain, smoke etc) that are sensed at step 315.

For example, different environmental conditions (e.g. day/night, rain, smoke etc) can be detected by one or more sensors. The camera iris based system having a built-in double threshold to make a change could also be used. For example, the threshold can be set to 50 for day and can be raised to 70 for a night. A time filter can also be used, whereby a certain value is sustained over period of time to confirm whether it is day or night. The application computer system could also use other date and time inputs including inputs from its real time clock (RTC) and electronic calendar for the confirmation of day or night condition.

The markings of a runway are different during the day and night time. Usually, there are more markings during the night. The night markings supersede the day markings.

Step 317 provides adaptive pixel level edge map extraction (refer to FIG. 4), wherein an optimum FOD edge extraction threshold is derived, from a look up table (LUT), for extracting real FOD edges with minimum noise.

At step 319 (FIG. 3B), motion edge filtering is performed to generate a static edge map. At step 321, temporal filtering is performed to extract a robust edge map. Only those pixels that are accumulated to pass a certain threshold are considered as robust edge pixels (to be used in robust edge map).

Those pixels that flicker will not be able to accumulate to pass the threshold and thus will be deleted (not used in robust edge map).

At step 323, a check is made to determine if an adaptive background is learned. The system uses edge map for background learning. If the adaptive background 323 is not learned, an adaptive background edge map is initialized/updated at step 325. At step 327, a check is made to determine if the adaptive background map reaches a predefined condition. If it has reached, at step 329, an indication is flagged to notify that the adaptive background is learned. If it has not reached, the process returns to step 303 to continue to capture images.

If adaptive background 323 is learned, at step 331a composite background edge map is generated. The composite background map consists of adaptive background map generated/updated at step 325, previously saved day/night background map and seasonal marking map that are provided at step 333 once the processing is initialized at step 302. Seasonal markings are associated with runway markings under a particular season or weather condition (e.g. snow or rain). By processing the images or using external sensors, the system can identify those season or weather conditions to reduce false alarms. The composite background map includes the markings of the runway.

At step 335, a suspected edge map is extracted by comparing the composite background map and the edge map. At step 337, an edge filter is applied to filter any unwanted edges related to sudden environmental changes such as reflections due to rain. For example, under rainy conditions, an image of a runway light could be detected as a bright spot that may resemble a FOD. The system is able to detect such potential false alarms by comparing with previously stored images.

After step 337, the adaptive background map is updated at step 339 and a check is made to find if there is a day to night transition, or night to day transition at step 341. If there is a day to night transition, or night to day transition, the last day or night background map is loaded for immediate use at step 343 and the adaptive background map is stored as day/night background edge map at step 345 for next day use. If there is no day to night transition, or night to day transition at step 341, the process returns to step 303 to continue to capture images.

At step 347, the edge parameters (such as size, area etc) from the filtered suspected edge map from step 337 are computed. At step 349, a check is done to determine if the edge parameters exceed the threshold. If it is so, at step 351, the suspected region on the runway is overlaid on a video display and an operator in the control tower or control room is alerted of it either by an audible signal and/or visually and/or via wireless alert (such as GSM SMS or MMS). At step 353, upon being alerted, the operator performs pan and/or tilt and/or zoom operations using the surveillance cameras for visual verification. At step 353, if the FOD is confirmed, the runway recovery team is informed immediately through wireless means (such as GSM SMS or MMS) at 357. The image of the FOD continues to appear on the video display and the alert signal persists until the recovery team recovers or clears the FOD (i.e. remove the foreign object or debris or repair the runway damage) from the runway at step 359.

Figure 4:
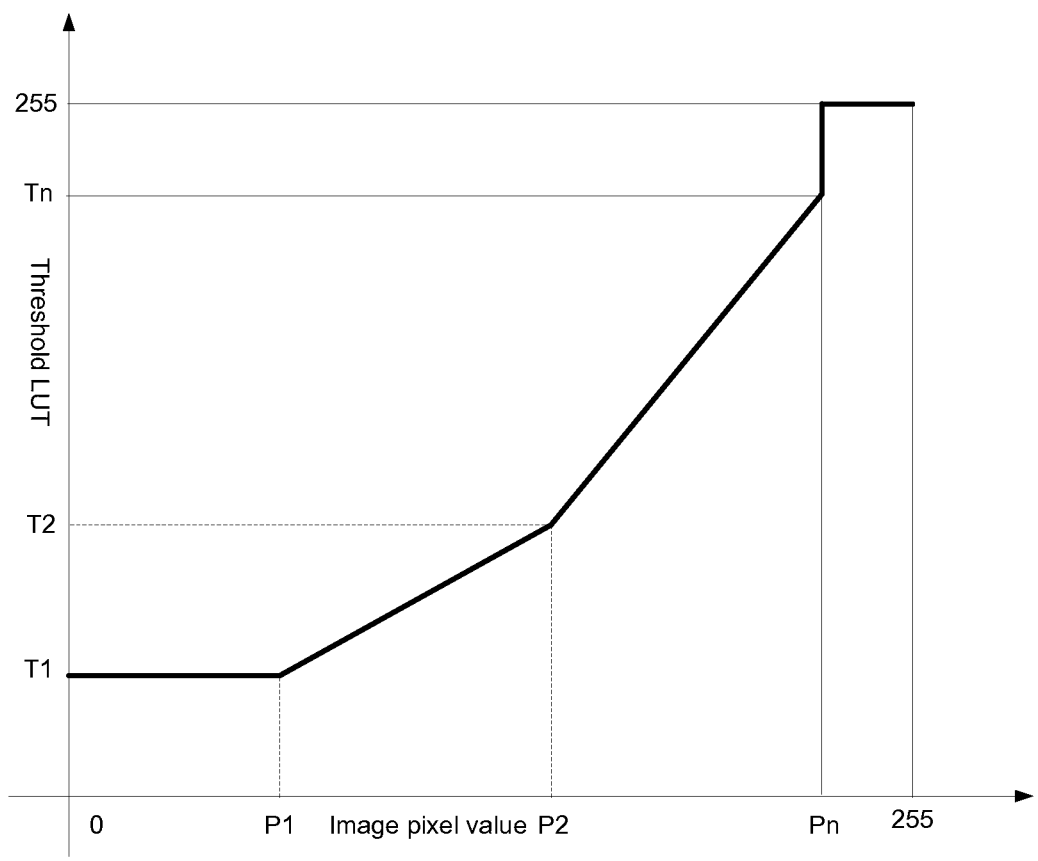
FIG. 4 is a graph showing a lookup table used to extract edge map in FIG. 3A.

FIG. 4 is a graph showing a lookup table (LUT) used to extract adaptive pixel level edge map at step 207 and step 317 as indicated above.

P1, P2 . . . Pn and T1, T2 . . . Tn are estimates based on statistical analysis of the captured image, the progressively learned image and external sensor input so that the optimal piecewise look up table (LUT) can be computed for generating pixel level threshold, which is used to extract FOD edge map with minimum noise.

The pixel value in the captured image or the progressively learned background image is mapped into a threshold value in the threshold image through the above LUT. After that, the captured image subtracts this threshold image. Any pixel value above 0 is be set to 255. This resultant image corresponds to the adaptive pixel level edge map (step 207 in FIG. 2 and Step 317 in FIG. 3A).

Runway scene calibration and FOD positioning may be performed in embodiments of the present invention.

Embodiments of the present invention also use color surveillance cameras and provide for color imaging processing.

However all the techniques and image processing methods described above work for both monochrome image processing and color image processing. Hence the runway surveillance system can use either monochrome cameras or color cameras.

The runway scene images acquired by the surveillance cameras in example embodiments are pre-calibrated such that the physical position and range corresponding to each pixel on the scene image is computed either using a mathematical formulae or a pre-computed lookup table which maps each pixel in the runway scene image to a specific precise co-ordinate in the 2D or 3D physical real-world co-ordinate frame (x, y, z) of the reference datum (such as WGS 84 or Airport Grid) defined on the area of surveillance such as a runway.

The system makes use of static runway features for runway scene calibration. For example the position and range of these static runway features with respect to some fixed real-world reference location can be pre-determined from ground survey, physical measurement or from the runway map. For example, one such useful feature is to place markers or use runway edge light on the runway along the longitudinal direction of the runway and the same vertical (y axis) distance from the side of the runway. Since these markers are along the longitudinal (horizontal) direction of the runway and on the same vertical distance from the side of the runway, the horizontal (x axis) distance separation of these markers can also be mapped to pixel count in the runway scene image. Thus, the horizontal (x axis) pixel mapping ratio (meter/pixel) can be derived by dividing the physical ground horizontal distance between the 2 markers by the horizontal pixel width (number of pixels between the 2 markers on the runway image). A minimum of two static runway features with known positions can be used to calibrate each scene image.

For example for more accurate scene calibration and to cater to uneven runway surfaces, a number of pairs of runway markers are preferably placed along the longitudinal direction of the runway (with the same vertical distance from the side of the runway) to mark a series of virtual horizontal lines on the runway. The ground physical distance of these horizontal virtual lines (between each pair of markers) can be measured using a measuring tape or measuring wheel or GPS receiver. The number of pixels on this horizontal virtual line for a specific camera setting is measured from the runway section image.

For example the surveillance camera's field of view on a runway has a trapezoidal shape. Therefore, the pixel mapping ratio (meter/pixel) of the runway image is different across a vertical direction (Y axis) of the runway. Thus, the far side of the runway is narrower and has a larger pixel mapping ratio (meter/pixel) while the near side is wider and has a smaller pixel mapping ratio (meter/pixel). The system makes use of two parallel horizontal runway lines on each side of the middle line and the middle line to determine the correct pixel mapping ratio (for the vertical y axis) for mapping the image pixels to the precise co-ordinates onto the real-world reference co-ordinate frame based on the datum used (which could be WGS 84, Airport Grid or Cartesian coordinate system). Thus, since the physical vertical (y axis) distance between the runway horizontal line and the middle line can be measured on the ground, the vertical pixel mapping ratio (meter/pixel) can be derived by dividing the physical vertical distance between these lines (measured on ground) by the number of pixels between these lines (derived from the vertical pixel width on the runway image).

Figure 7:
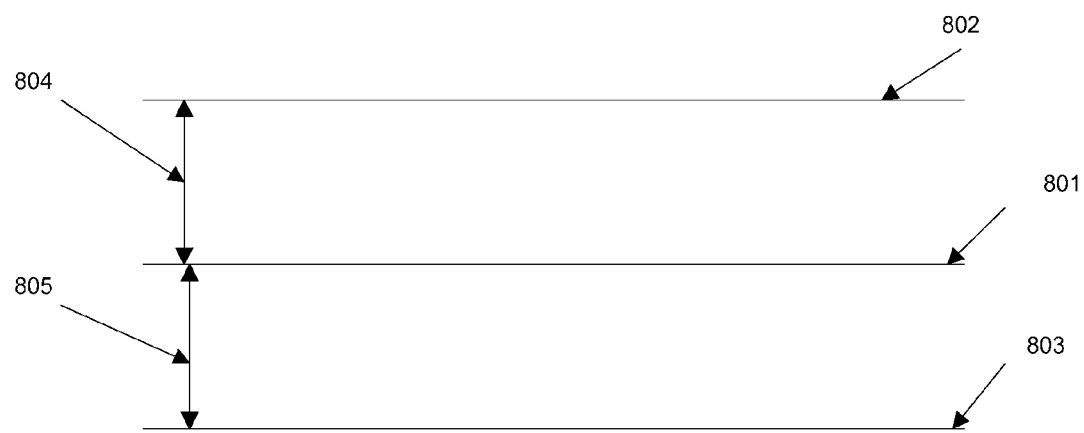
FIG. 7 is a schematic drawing illustrating runway lines according to an embodiment which makes use of runway lines for image calibration (pixel to real world co-ordinate calibration).

FIG. 7 is a schematic drawing illustrating example runway lines according to an example embodiment. There is one horizontal runway line 802 at the far side of the runway and another horizontal runway line 803 at the near side of the runway. 802 could also be the runway edge line at the far side and 803 could also be the runway edge line at the near side of the runway. Both these lines 802, 803 are parallel to the middle line 801 and all these lines are along the horizontal direction (x axis) of the runway. The physical vertical distance between the near side horizontal line 803 and the middle line 801 is 805 and the vertical pixel width (no of pixels) between these 2 lines on the runway image is y1 pixels. Thus, the vertical pixel mapping ratio for the near side is obtained by dividing 805 by y1 (meter/pixel). Similarly, the physical vertical distance between the far side horizontal line 802 and the middle line 801 is 804 while the vertical pixel width (no of pixels) between these 2 lines on the runway image is y2 pixels. Thus, the vertical pixel mapping ratio for the far side of the runway is obtained by dividing 804 by y2 (meter/pixel). Thus, 2 different vertical (y axis) pixel mapping ratios (805/y1 and 804/y2) are used for mapping the pixels on the runway image to precise co-ordinates on the real-world reference co-ordinate frame depending on whether the pixel lies in the near side or far side of the runway using the middle line as reference.

The above technique can improve the pixel mapping accuracy. Calibration can be based on different real-world co-ordinate datum e.g. WGS84, Airport Grid or Cartesian coordinate system.

The runway edge/middle/horizontal lines can be of any color. Calibration can be done as long as a contrast exists between the runway edge/horizontal/middle lines and a runway surface. Furthermore, the runway edge and middle lines need not be continuous. Continuous lines can be derived by interpolating adjacent lines.

Alternative embodiments of the present invention can optionally or additionally make use of stereo vision using a pair of surveillance cameras to cover the same segment of the runway. When using stereo vision, FOD range and position can also be computed from the difference image obtained by comparing the two images as captured by the two cameras covering the same area on the area of surveillance (field of view) on the runway.

Localized features are detected in each image of a stereo image pair and then matched between the images. This results in a sparse but high quality set of disparity vectors (which measure the relative positions of image features as seen in each image). From these disparity vectors, 2D and 3D estimates of the feature positions can be computed and compared with a flat (or at least a smooth) model of the runway surface. Alternatively, images can be registered at the pixel level providing a dense set of disparity vectors of more variable quality.

One of the challenges of stereo imaging is the determination of the correspondences of pixels of two images used in the range computation. The pixel correspondence techniques employed include using cross correlation operator, symbolic matching with relational constraints and combinations of these techniques.

For example, if it is required to correlate pixels between two images (Image1, Image 2) acquired by a set of stereo cameras, cross relation is based on the assumption that for a given point P1 in Image1, there is a fixed region of Image 2 in which point P2 which correspond to P1 must be found. The size of this region is determined by parameters pertaining to camera setup obtained from the camera calibration process. The symbolic matching approach to determining correspondence searches for a feature in one image that matches a feature in the other. Typical features used are junctions, line segments or regions. The correspondence of junctions produces a sparse depth map with the depth known only at small set of points. The correspondence of line segments can lead to correspondence between their endpoints.

Figure 5:
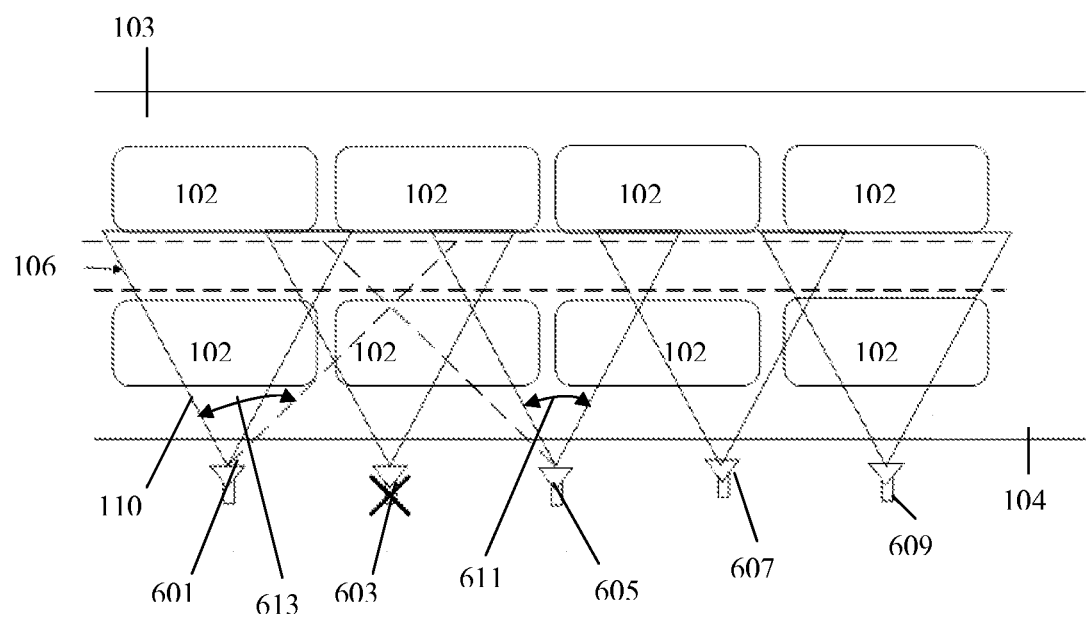
FIG. 5 is a schematic drawing illustrating redundant coverage of surveillance cameras in a surveillance system to detect FOD on a runway.

An alternative embodiment of the present invention provides for redundant coverage of surveillance cameras. FIG. 5 is a schematic drawing illustrating redundant coverage of surveillance cameras in a surveillance system 600 to detect FOD on a runway. The surveillance cameras 601, 603, 605, 607, 609 are positioned on one edge of a taxiway 104. In case all the surveillance cameras 601, 603, 605, 607, 609 are functioning normally, the angle of coverage (angle of view) 611 of each surveillance camera 601, 603, 605, 607, 609 usually remain equal. In case camera 603 becomes faulty and redundant, the usual angle of coverage (angle of view) 611 of each of the surveillance cameras 601 and 605 that are adjacent to the redundant camera 603 extends to 613, towards the field of view of the redundant camera 603. In this way, the surveillance system 600 is operable to work even if one or more cameras fail to function. For example, the coverage field of view (angle of view) of a camera can be manually adjusted or performed by an operator, remotely, using the application computer system which remotely controls the camera's zoom or PTZ function. The adjustment can also be automatically performed by the application computer system. For example, a camera having a zoom function or a pan tilt zoom (PTZ) camera may be used to alter the coverage field of view (angle of view).

Figure 6:
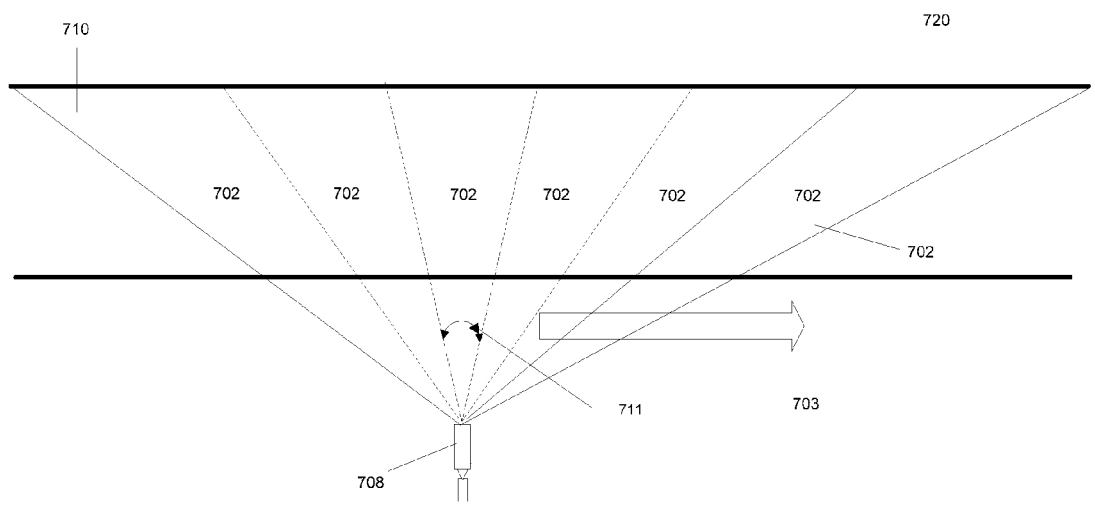
FIG. 6 is a schematic drawing illustrating a runway surface scanning according to an alternative embodiment.

FIG. 6 is a schematic drawing illustrating a runway surface scanning according to an alternative embodiment.

The runway surface area 700 under surveillance is divided into numerous segments 702 that cover small areas on the runway surface 700. The entire runway surface 700 area is scanned, segment-by-segment, using one or more non-static camera 708 that can cover a field of view having a horizontal angle of view 711. Example of non-static camera is a Pan Tilt Zoom (PTZ) camera. The pan tilt zoom function of the PTZ camera is controlled remotely by the application computer system or a camera controller. The runway surface area 700 is scanned sequentially from one end 710 to another end 720 along the longitudinal direction 703 by the use of one or more non-static camera.

Runway surface scanning according to an alternative embodiment is controlled by the application computer system or a camera controller. The challenge of this method of runway scanning is the long FOD detection time especially when the FOD happens to be located at the segment nearing the end of the scanning cycle. To speed up the runway scanning cycle time, an alternative method is to skip one or even two segments i.e. scan one segment for every two or even three segments. During the next scanning cycle, the previously unscanned segments are scanned, while those scanned during the previous cycle are not scanned in this cycle. The trade-off in runway scanning method is the long detection time to detect FOD that happen to lie at the unscanned segments on the runway surface.

Since FOD on the runway are mainly caused by aircraft take off and landing, another method to reduce the FOD detection time in alternative embodiment is to make use of a combination of non-static or static surveillance cameras. The static camera preferably has adequately wide field of view (wide angle of view) to cover a significant section of the runway. By processing the images captured by the static surveillance camera in real-time, the application computer system can detect the occurrence and location of air craft take off and landing on the runway. Then the non-static surveillance camera can be directed by the application computer system to first scan those segments covering specific locations on the runway where the aircraft landing or take-off has just occurred. This method can help in reducing FOD detection time.

If the static surveillance camera detects an FOD, the application computer system in a control tower or control room determines the position and range of the detected FOD on the runway based on scene images captured by the static camera. The determination of the position and range of the detected FOD on the runway surface is achieved by using monoscopic vision with calibrated scene image of the runway. For example in the calibrated runway scene image each pixel is mapped onto precise co-ordinate on the real-world co-ordinate frame (which could be based on WGS 84 or Airport Grid datum). Alternatively stereoscopic vision based object positioning and ranging techniques could also be used.

The information regarding the range and location of FOD as detected by the static surveillance camera (monoscopic or stereoscopic) is utilized by the system to automatically control the non-static cameras (for example, a panning camera or a pan tilt zoom (PTZ) camera or a zoom camera) to pan and/or tilt and/or zoom and/or focus on to an FOD or area of interest on the runway and to obtain telephoto images on a video display of the FOD or area of interest with sufficient details to confirm the presence of detected FOD or to filter a false alarm. These telephoto images are also utilized for accurate characterization and classification of the detected FOD. Accurate object features including object length, height, area, perimeter, texture, chromatic properties can extracted from these telephoto images, which can be used as inputs to a pre-trained object classifier.

Alternative embodiments of the present invention can also provide filtering out background clutter due to rain. Typically, rain clutter does not only occur only in localized area on the runway, but also across the entire runway. Rain can also cause motion clutter in the runway scene image with specific characteristics such as splashes when the rain hits the runway surface. Thus, one method to filter away rain clutter is to detect and recognize motion clutter in the runway scene with rain-like characteristics that occur across the entire runway. Since rain clutter is not static and varies between frames, temporal filtering could also be used to filter rain clutter. Thus motion clutter with rain like characteristics which occur across the entire runway will be filtered out as rain clutter. The above principle can also be applied to filter background clutter due to snow in alternative embodiment. Thus motion clutter with snow like characteristics which occur across the entire runway will be filtered out as snow clutter using temporal filtering.

In example embodiments of the present invention, reference background images obtained from the surveillance cameras are pre-processed using edge detection techniques to make the system more resilient to illumination changes, clutter and to reduce false alarms Edge enhancement and detection techniques are used to identify edges of runway features. An edge in an image is a contour across which the pixel properties change abruptly. Edge enhancement and detection is used to improve resilience to illumination changes for foreground pixel identification based on background subtraction and/or learning.

Embodiments of the present invention described above can have one or more of the following features:

image enhancement of a runway image by using high pass filters (such as Sobel X from left_to_right plus right_to_left or Scharr X) to enhance features that have high gradient change in the direction parallel to the runway Optimal estimation of FOD edge extraction threshold. The estimation adapts to different environmental conditions (e.g. rain, light reflection, night time etc. . . . ) and make use of statistical methods based on progressively learned background edge map to determine the grayscale lookup table (LUT) to be used to generate pixel level threshold map for adaptive pixel level edge map extraction Temporal filtering applied to pixel level to retain robust edge by using a stack of edge maps to reduce the noise. Only pixels exceeding threshold will be classified as robust edge pixels and the remaining pixels will not be used for the edge map.

Adaptive background learning which compares current edge image with background image at previous instants to capture the slow feature changing process on the runway to allow these features to blend into the background without generating false alarm.

Composite background edge map which consist of adaptive background edge map and the previously learned background map and optionally seasonal markings (generated for particular season or weather condition such as snow).

Generation of suspected edge map by comparing the edge map and the composite background map Edge filtering to filter some of the edges that could be due to sudden environmental changes e.g. reflection due to rain or other weather conditions.

FOD detection on a runway with abnormal light detection during night time (such as due to aircraft landing, aircraft taking off, ground vehicle movement etc. . . . ) by using global histogram and statistical analysis to compare with progressively updated image to determine the abnormal light condition.

day/night surveillance for detecting FOD on a runway without the need for installation of assisted illumination (such as laser or infrared illuminators).

imaging means for capturing images of the runway with automated, computer-assisted, and/or manual zoom-in view capabilities to ensure that all foreign objects are accurately detected, identified and located on the runway.

passive in nature, eliminating the requirement for installation of assisted illumination (such as laser or infrared illuminators) in dark or low illumination conditions.

color images during day and night.

processing video and/or still picture images obtained from a network of surveillance cameras using computer vision image processing techniques to detect, locate or identify FOD. The surveillance cameras can be single or multiple, movable and/or static, flexibly locatable in the designated area of surveillance.

The cameras may be deployed at greater distance form the runway due to the improved image processing using adaptive image processing in the example embodiments compared to existing systems, which can reduce the number of cameras used and/or reduce "interference" with the existing infrastructure, and/or reduce obstruction near the runway.

Figure 8:
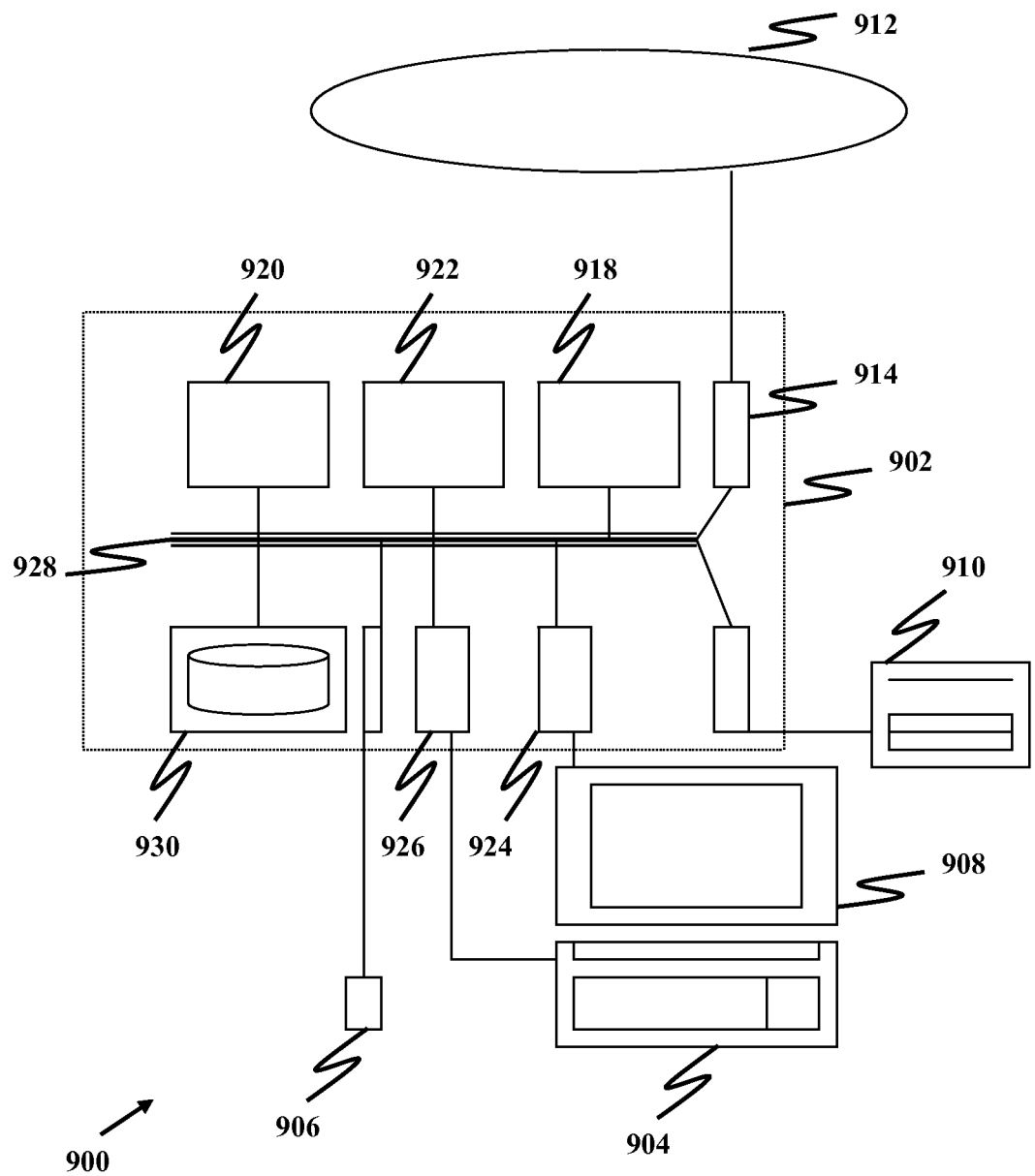
FIG. 8 shows a schematic drawings illustrating a computer system for implementing the method and system of the example embodiment.

The method and system of the example embodiment can be implemented on a computer system 900, schematically shown in FIG. 8. It may be implemented as software, such as a computer program being executed within the computer system 900, and instructing the computer system 900 to conduct the method of the example embodiment.

The computer system 900 comprises a computer module 902, input modules such as a keyboard 904 and mouse 906 and a plurality of output devices such as a display 908, and printer 910.

The computer module 902 is connected to a computer network 912 via a suitable transceiver device 914, to enable access to e.g. network systems such as Local Area Network (LAN) or Wide Area Network (WAN).

The computer module 902 in the example includes a processor 918, a Random Access Memory (RAM) 920 and a Read Only Memory (ROM) 922. The computer module 902 also includes a number of Input/Output (I/O) interfaces, for example I/O interface 924 to the display 908, and I/O interface 926 to the keyboard 904.

The components of the computer module 902 typically communicate via an interconnected bus 928 and in a manner known to the person skilled in the relevant art.

The application program is typically supplied to the user of the computer system 900 encoded on a data storage medium such as a CD-ROM or flash memory carrier and read utilizing a corresponding data storage medium drive of a data storage device 930. The application program is read and controlled in its execution by the processor 918. Intermediate storage of program data maybe accomplished using RAM 920.

The invention is not limited the above embodiments. However, those skilled in the art will recognize that the invention can be practiced, with modification, in the light of the information contained herein without departing from the scope of the invention.

The invention claimed is:

1. A surveillance system for detecting a foreign object, debris, or damage (FOD) on a runway, comprising:
   one or more cameras for capturing electronic images of the runway; and
   an image processing system for detecting the FOD on the runway based on adaptive image processing of the electronic images captured by the cameras and for applying image enhancement to eliminate areas of the captured electronic images having gradual grayscale change in a direction parallel to the runway, to eliminate runway white lines and to enhance features having high grayscale gradient in the direction parallel to the runway in the captured electronic images,
   wherein the image processing system is configured to subject the captured electronic images to background learning after the image enhancement is applied, and generate a composite background edge map during the background learning, the composite background edge map comprising an adaptive background edge map, a previously learned and saved day or night background edge map, and a seasonal marking map generated for a particular season or weather condition,
   wherein the surveillance system is adaptively operable for FOD detection under both day and night ambient light conditions without assisted illumination including infrared or laser illuminators,
   wherein the image processing system is configured to generate a robust edge map comprising selected pixels from the captured electronic images,
   wherein the image processing system is configured to compare the composite background edge map and the robust edge map, and remove background edges to extract a suspected edge map of FOD.

2. The surveillance system according to claim 1, wherein the captured electronic images are enhanced by using a high pass filter, a Sobel X from left_to_right filter and a Sobel X from right_to_left filter, or a Scharr X filter.

3. The surveillance system according to claim 1, wherein the image processing system is configured to determines if an instant of processing is a day-time or night-time; and detect an abnormal light condition from the captured electronic images during night-time, wherein the abnormal light condition is due to aircraft landing or aircraft taking off or ground vehicle movement.

4. The surveillance system according to claim 3, wherein detecting of the abnormal light condition comprises global histogram and statistical analysis to compare each captured image with one or more preceding images and identifies the abnormal light condition based on a change in intensity with reference to a threshold value.

5. The surveillance system according to claim 3, wherein captured electronic images for which the abnormal light condition are detected are ignored from further processing.

6. The surveillance system according to claim 1, wherein the image processing system is configured to apply temporal filtering to a stack of pixel level edge maps to obtain the robust edge map which consists only of pixels that have accumulated to pass a threshold.

7. The surveillance system according to claim 6, wherein the image processing system is configured to subject the robust edge map to adaptive background learning, the adaptive background learning comprising:
   comparing background edge images obtained at previous instants with current image;
   identifying slow-change features on the runway; and
   updating the background edge image with the slow changing features.

8. The surveillance system according to claim 1, wherein the edge filtering filters unwanted edges related to the environmental conditions from the suspected edge map, and computes edge parameters of FOD from the suspected edge map.

9. The surveillance system according to claim 8, wherein the environmental conditions include day to night transition, or night to day transition, weather conditions, rain, smoke or cloud.

10. The surveillance system according to claim 1, wherein the image processing system is configured to overlay an FOD graphic on a suspected region of the runway on a video display to alarm an operator at a control tower or control room of FOD detection.

11. The surveillance system according to claim 10, wherein one or more of the cameras, or one or more additional cameras are arranged for zooming on to the suspected region for visual verification.

12. The surveillance system according to claim 1, wherein the image processing system is configured to classify the FOD.

13. The surveillance system according to claim 1, wherein the one or more cameras are one or more static cameras, one or more non-static cameras or a combination of both static and non static cameras.

14. The surveillance system according to claim 1, wherein the one or more cameras are placed on one side of the runway.

15. The surveillance system according to claim 1, wherein the one or more cameras are placed on either sides of the runway in a staggered manner.

16. The surveillance system according to claim 1, wherein on a condition that one or more cameras fail to function, respective adjacent ones of the cameras are operable to cover areas covered by the failed cameras.

17. The surveillance system according to claim 1, wherein the one or more cameras are one or more monochrome cameras, one or more color cameras or both.

18. The surveillance system according to claim 1, further comprising one or more night vision cameras.

19. The surveillance system according to claim 1, wherein a runway surface is divided into a plurality of segments, and one or more non-static cameras sequentially scan the runway surface segment-by-segment for FOD detection.

20. The surveillance system according to claim 1, wherein a static camera detects respective locations of aircraft take off and landing on the runway such that a non-static camera is directed to first scan runway segments in the respective locations of aircraft landing or take off to reduce FOD detection time.

21. The surveillance system according to claim 1, wherein the image processing system is configured to apply temporal filtering to filter out rain clutter in runway scene images by recognising characteristics of rain motion clutter and based on the motion clutter due to rain occurring across the entire runway.

22. The surveillance system according to claim 1, wherein the image processing system is configured to apply temporal filtering to filter out snow clutter in runway scene images by recognising characteristics of snow motion clutter and based on the motion clutter due to snow occurring across the entire runway.

23. The surveillance system according to claim 1, wherein the image processing system is configured to make use of markers or runway edge lights located along a longitudinal (horizontal) direction on the runway and on a same vertical distance from a side of the runway for runway scene calibration to map pixels on the images of the runway to precise co-ordinates on a real-world co-ordinate frame (including WGS84 or Airport Grid).

24. The surveillance system according to claim 1, wherein the image processing system is configured to make use of two parallel horizontal runway lines on each side of a runway middle line and the runway middle line to derive two vertical pixel mapping ratios for runway scene calibration to map pixels on the images on the runway to precise co-ordinates on a real-world co-ordinate frame (including WGS84 or Airport Grid).

25. The surveillance system according to claim 1, wherein the image processing system is configured to make use of monoscopic vision and a calibrated runway scene image captured by a monoscopic camera to determine position and range of the FOD on the runway.

26. The surveillance system according to claim 1, wherein the image processing system is configured to make use of a position and range of the FOD determined by a static camera and a calibrated runway scene image to automatically control a non-static camera (including a pan tilt zoom camera) to pan and/or tilt and/or zoom and/or focus onto a FOD to obtain telephoto images of the FOD with sufficient details to enable a verification of detected FOD or to filter a false alarm.

27. The surveillance system according to claim 1, wherein the image processing system is configured to make use of stereo vision using a pair of surveillance cameras to cover a same segment of the runway so that FOD range and position can be computed from a difference image obtained by comparing images as captured by the pair of surveillance cameras covering the same segment of surveillance (field of view) on the runway.

28. The surveillance system according to claim 1, wherein the image processing system is configured to adaptively estimate one or more threshold values for optimal FOD edge extraction for different environmental conditions; and generate a pixel level edge map using a statistical method based on progressively learned background image edge map to determine a grayscale lookup table (LUT) to be used to generate pixel level threshold map.

29. The surveillance system according to claim 1, wherein the image processing system is configured to perform edge filtering on the suspected edge map to locate and filter out light reflection on the runway resulting from environmental conditions.

30. The surveillance system according to claim 1, wherein the image processing system is configured to detect motion in the captured electronic images and to subject captured electronic images devoid of motion to the background learning.

* * * * *